United States Patent [19]

Curnow

[11] Patent Number: 5,261,637
[45] Date of Patent: Nov. 16, 1993

[54] ELECTRICAL VARIABLE ORIFICE ACTUATOR

[75] Inventor: John W. Curnow, Utica, Mich.

[73] Assignee: Lectron Products, Inc., Rochester Hills, Mich.

[21] Appl. No.: 909,987

[22] Filed: Jul. 7, 1992

[51] Int. Cl.$^5$ ............................................. F16K 31/06
[52] U.S. Cl. ................................. 251/129.15; 335/262; 251/129.02
[58] Field of Search .................. 251/129.02, 129.15; 138/44, 45, 46; 335/261, 262

[56] References Cited

U.S. PATENT DOCUMENTS

| | | | |
|---|---|---|---|
| 3,593,241 | 7/1971 | Ludwig | 251/129.15 X |
| 3,598,360 | 8/1971 | Merriner et al. | 251/129.15 |
| 4,629,025 | 12/1986 | Brasier et al. | 180/142 |
| 4,697,608 | 10/1987 | Kolze et al. | 251/129.15 |
| 4,712,767 | 12/1987 | Losser et al. | 251/129.15 X |
| 4,744,389 | 5/1988 | Ishihashi | 251/129.15 X |
| 4,805,870 | 2/1989 | Mertz | 251/129.15 |
| 4,863,143 | 9/1989 | Cowley et al. | 251/129.15 |
| 5,050,840 | 9/1991 | Kondo et al. | 251/129.15 |
| 5,094,264 | 3/1992 | Miller | 251/129.15 X |
| 5,102,095 | 4/1992 | Schmitt-Matzen et al. | 251/129.15 |
| 5,154,148 | 9/1992 | Laurent | 251/129.15 X |

OTHER PUBLICATIONS

Drawing No. 5-10452-4, dated Jan. 2 1989, entitled "Actuator-Assy".
Drawing No. 5-10774-9, dated Jun. 26, 1989, entitled "Actuator Assy".

Primary Examiner—John Rivell
Attorney, Agent, or Firm—Harness, Dickey & Pierce

[57] ABSTRACT

A solenoid-operated control valve for a variable assist power steering system of an automobile vehicle includes a valve structure which defines a variable flow orifice in response to a predetermined variable (e.g., vehicle velocity) thereby providing fluid pressure needed to modify user input torque supplied to the steering wheel. The valve structure features a unique nonmagnetic core tube which reduces manufacture costs, enhances the ease of assembly of the magnetic housing elements needed to complete a magnetic circuit, and ensures the armature responds as needed to control orifice closure.

10 Claims, 3 Drawing Sheets

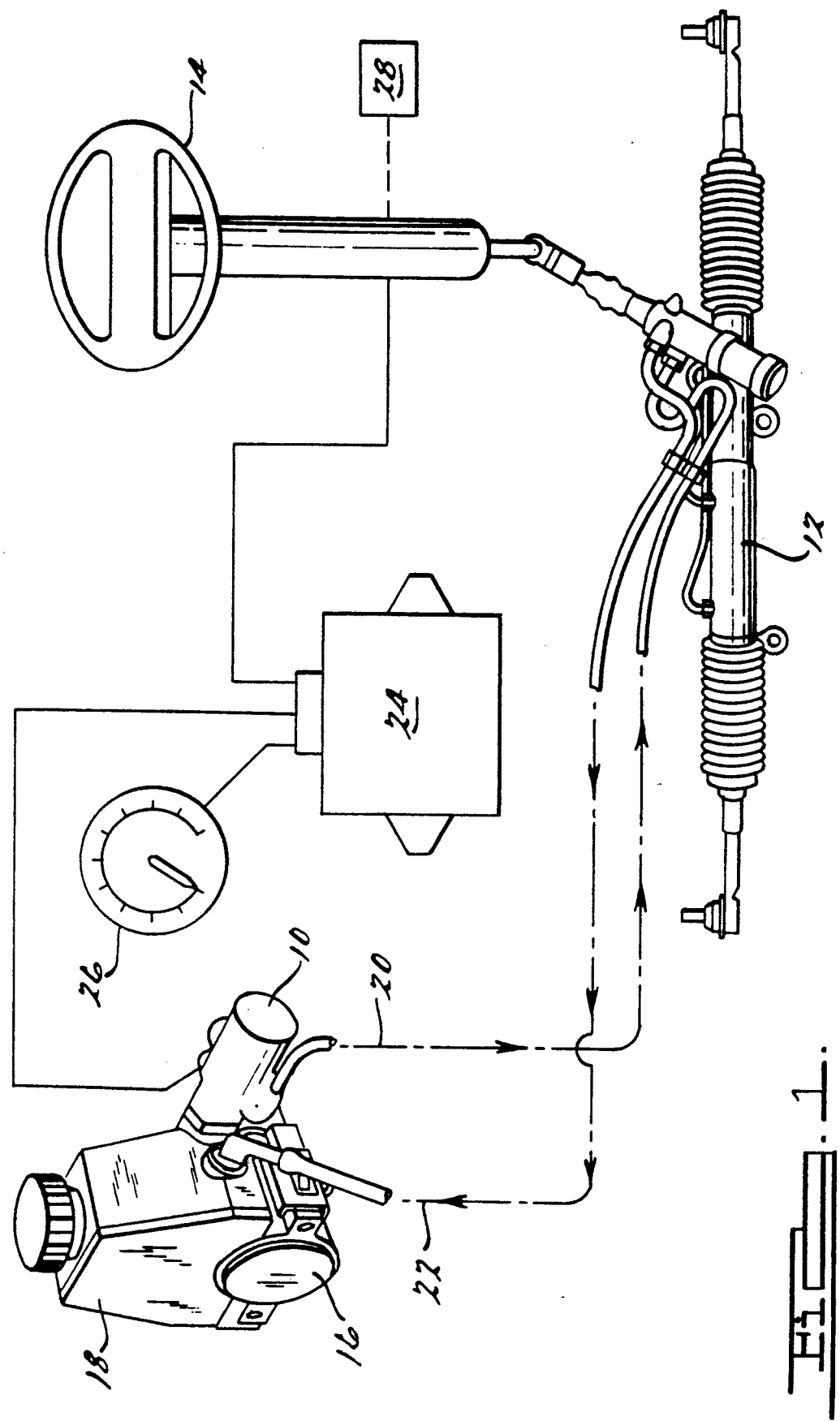

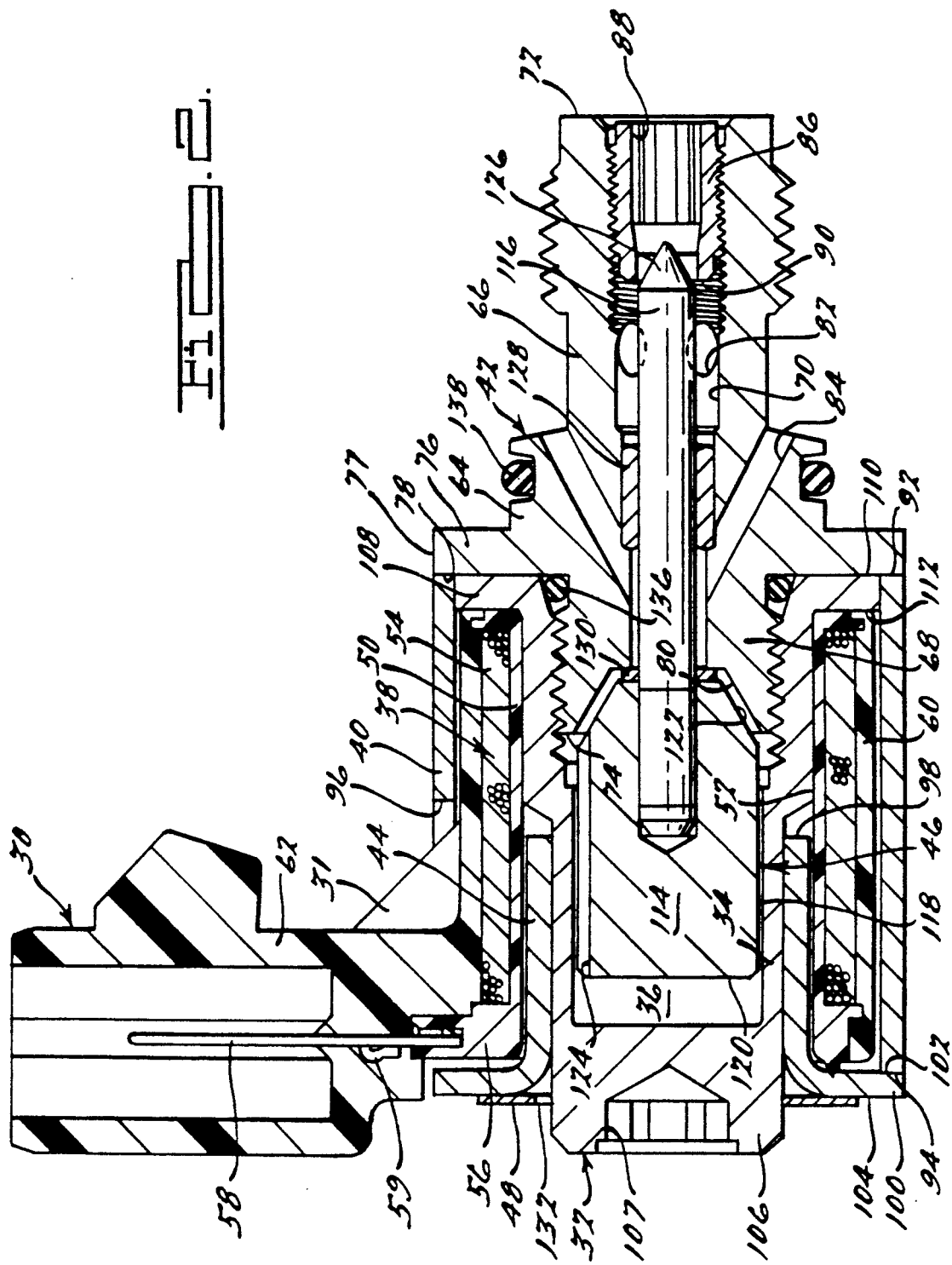

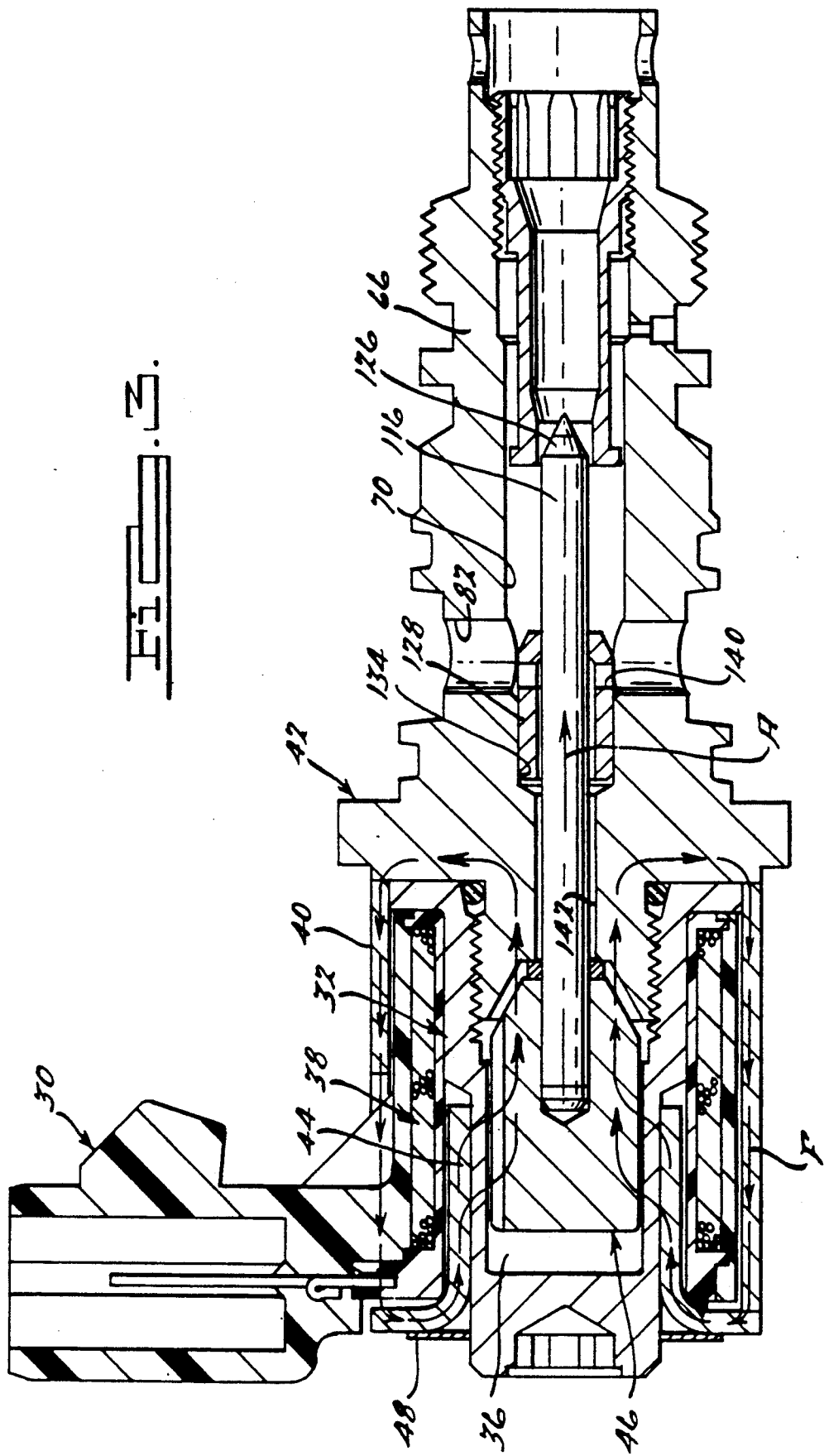

ELECTRICAL VARIABLE ORIFICE ACTUATOR

BACKGROUND AND SUMMARY OF THE INVENTION

This invention relates to a solenoid-operated fluid control valve for providing steering assist in the power steering system of a motor vehicle and more particularly to an electrical control valve which varies fluid hydraulic flow through the valve in relation to vehicle speed to effect a reduction in the level of assist provided in response to high speed vehicle operation.

Steering systems in which the hydraulic flow is controlled in relation to vehicle speed so as to effect a reduction in the level of assist provided during vehicle operation are known. Illustrative of one such system is "Flow Regulated Power Assist Steering System with Evasive Maneuver Capability" U.S. Pat. No. 4,629,025, issued Dec. 16, 1986. In this system, a solenoid-operated flow control valve is located in the fluid path of the power cylinder of the steering unit and is controlled by an electronic control unit (ECU) in response to vehicle speed and handwheel position signals. Generally, fluid flow is reduced as vehicle speed increases, thus providing a high level of hydraulic flow (and steering assist) at low vehicle speeds, such as in parking lot maneuvers and fast wheel movement by the user, and a lower level of hydraulic flow (and steering assist) at highway speeds to improve on-center stability of the vehicle.

The above-disclosed flow control valve has a complex arrangement of fluid chambers, flow paths and plungers which move to open or close a fixed orifice whereby to control fluid flow. A simpler and more cost-effective solenoid control valve that modulates steering effort, according to vehicle speed, is desirable.

It has long been an object in the design of solenoid valves to improve mechanical reliability and reduce the costs of manufacturing and assembly costs. Although a multi-part assembly is costly to manufacture, a solenoid valve must be assembled from several parts with the operation of the valve requiring that preselected of the parts be comprised only of a magnetizable material whereby to function as a part of the requisite magnetic circuit and other of the parts be nonmagnetic.

In an effort to reduce the number of parts needed without affecting the requisite magnetic circuit, several parts of magnetic and nonmagnetic material have been brazed together to form a composite structure for supporting the movable armature of the valve. However, the brazing operation requires close control of temperature versus time in the process furnace, which is difficult to control in high production, and if not brazed enough results in waste and high rejection rate, thereby increasing the costs of manufacture. Additionally, a bimetallic support assembly is prone to the effects of different thermal expansion rates which inhibits its use in applications subject to temperature differentials.

In accordance with the invention herein, a solenoid operated fluid control valve, which is adapted to be mounted in a fluid passage to control fluid flow therethrough, includes a protective dielectric housing molded about a solenoid coil, a magnetically responsive housing comprising a magnetizable fluid fitting (i.e., the pole piece) provided with a closable orifice and fluid inlet and outlet passages, and a pair of sleeves of magnetizable material assembled to the dielectric housing; a one-piece, generally cylindrical cup-shaped core tube comprised of a nonmagnetizable material connected to one end of the fitting whereby to form a subassembly that is removably inserted into the coil; and an armature assembly movably mounted in the core tube and including a nonmagnetic plunger to restrict fluid flow through the orifice and a magnetizable armature. A nonmagnetic ring separates the pole piece from the armature to form an air gap therebetween and to space the plunger end from closing relation with the fluid inlet.

A magnetic circuit is formed by the concentric sleeves, the fluid fitting, and the armature. As a result of electrical current being provided to the coil, a magnetic field is induced in the magnetic circuit and magnetic flux passed therethrough whereby the plunger is moved relative to the fluid inlet.

The core tube is of unitary construction, defines a fluid pressure chamber sized to receive and position the armature relative to the coil, and is configured to assist in the efficient assembly of the magnetic portions of the valve relative to the electrical coil. The cylindrical wall of the core tube supports the inner sleeve and forms a balanced radial magnetic gap around the armature whereby to obviate pull forces on the armature. The strength of the magnetic field is enhanced by radially directing the magnetic flux between the outer and inner sleeves, first by conically shaping the confronting end faces of the armature and pole piece for nested fitment and separated by a like-shaped air gap, second by abutting one end of the outer sleeve with a pole piece flange, and third by abutting a radially outwardly extending flange on the inner sleeve against the other end of the outer sleeve.

The core tube herein advantageously provides an armature structure which is less expensive to make and enhances the rapid and cost efficient assembly of necessary valve parts, provides a closely toleranced part, is durable and rugged, and formed by a cost-effective process in which accuracy is easy to control.

Additionally, the one-piece core tube eliminates joints which could have an adverse effect on the concentricity needed for precise and rapid positioning and repositioning of the armature to achieve optional flow control, obviates the problems associated with metal joining operations, and enhances its use in fluid pressure systems requiring the armature housing to function as a fluid pressure containment device.

A retention ring is easily connected to one end of the core tube and against the inner sleeve to assist in the parts being retained in operable relation to the dielectric housing, the ring being removably mounted for disassembly and repair of the valve.

Additional objects, advantages and features of the present invention will become apparent from the following description and appended claims, taken in conjunction with the accompanying drawings.

BRIEF DESCRIPTION OF THE DRAWINGS

FIG. 1 is a schematic view of an automobile vehicle steering system incorporating an electronic variable orifice actuator valve according to the present invention.

FIG. 2 is a cross-sectional elevation view of another embodiment of an actuator valve according to the present invention.

FIG. 3 is a cross-sectional elevation view of the actuator valve of FIG. 1 at high speed vehicle operation.

DETAILED DESCRIPTION OF THE PREFERRED EMBODIMENTS

FIGS. 1 through 3 illustrate exemplary preferred embodiments of the present invention, as applied to an electromagnetic flow control valve 10 for an automobile vehicle steering system. One skilled in the art will readily recognize from the following discussion that such illustrative embodiments are exemplary and that the present invention is also applicable to other solenoid and electromagnetic position and control actuator constructions.

Turning now to the drawings, FIG. 1 illustrates an automobile vehicle having a variable assist power steering system that includes a steering gear 12 adapted to be connected in operable relation with the vehicle wheels (not shown) and operated by a steering wheel 14, a fluid pump 16, which contains pumping, flow control and pressure relief elements, for pumping fluid from a fluid reservoir 18 to the flow control valve 10, a fluid conduit 20 for communicating fluid from the control valve to the steering gear whereby to provide fluid assist in steering, and a fluid conduit 22 for returning excess fluid from the steering gear to the reservoir.

An electronic control unit 24 is electrically connected to the control valve 10, a vehicle speed indicator 26, and a steering wheel speed sensor 28. The electronic control unit (ECU) controls the amount of electrical current supplied to the control valve 10 in response to measured values of vehicle speed and steering wheel speed. Generally, the ECU operates to increase the current supplied to the control valve whereby to reduce the hydraulic flow through the valve with increasing vehicle speed yet maintain a predetermined flow of fluid regardless of the vehicle speed. The ECU is programmed by the user to provide the signals desired and forms no part of this invention. Accordingly, the ECU will not be described in greater detail herein.

FIGS. 2 and 3 illustrate preferred embodiments of the electromagnetic flow control valve 1 according to this invention. Each of these valves are similar and the specific elements in each will be referred to by the same reference number, except where noted. In each of the solenoid control valves described herein, the output is substantially linearly proportional to the input electrical current.

Referring now to FIG. 2, the flow control valve 10 includes a nonmagnetic protective housing 30, a nonmagnetic core tube 32 in the form of a cylindrical frame 34 having an interior chamber 36, a solenoid coil 38 encircling the core tube, a magnetizable outer sleeve 40 encircling the solenoid, a magnetizable fluid fitting 42 affixed to the core tube, a magnetizable inner sleeve 44 interposed between the solenoid coil and the core tube, and an armature assembly 46 movably mounted within the core tube. A retention ring 48 is utilized to engage the core tube and the inner sleeve whereby to connect the valve elements to the housing. A magnetic circuit is formed by the inner and outer sleeves 44 and 40, the fluid fitting 42, and the armature assembly 46. Generally, the sleeves 40 and 44, core tube 34, fitting 42, coil 38 and armature assembly 46 are concentrically arranged relative to the housing and the armature axis.

The solenoid coil 38 comprises a bobbin 50 including a cylindrical spool portion having opposite ends, a central bore 52 extending through the spool, and an outer surface about which an electrical wire is wrapped whereby to form a cylindrical coil 54. A terminal block portion 56 is integrally formed at one end of the spool portion to receive and position a pair of electrical terminals 58, one terminal being terminated to each respective wire end 59.

The protective housing 30 includes a first body member 60 for mounting the above valve elements, in a manner to be described hereinbelow, and a second body member 62 which defines a mateable connector housing. Preferably, the housing 30 is integrally molded from a suitable thermoplastic and directly about the solenoid coil 38, such as in a single step of an injection molding operation. By embedding the solenoid coil into the plastic, the protective housing thereby assures that the wire coil and the terminated wire ends will not be damaged during assembly of the valve. Additionally, as a result of the molding operation, the terminals 58 are safely positioned within the connector housing 62 for mating.

The fluid fitting 42 is formed of a magnetizable material, such as a ferromagnetic material (e.g., a low carbon steel) and comprises the pole piece of the electromagnetic circuit. The fluid fitting 42 includes a generally cylindrical body 64 having opposite axial end portions 66 and 68, a cylindrical stepped bore 70 extending axially between the inlet and outlet ends 72 and 74 of the body, and a medial flange 76 having a mating face 78. The end 72 defines a fluid inlet into the fitting and the wall of the bore 70 adjacent to the end 72 is threaded. The end 74 of the fitting has a frustoconical-shaped countersunk recess 80 to assist in forming a flux directing face relative to the armature, in a manner to be described.

Each of the end portions 66 and 68 of the body are externally threaded with the threaded end portion 66 being adapted for threadable fitment into the pump 6 and the threaded end portion 68 being adapted for threadable fitment into the core tube 32. Further, the threaded end portion 66 includes a plurality of radial fluid outlets 82 for passing fluid from the inlet to the fluid conduit 20 leading to the steering gear, and a plurality of fluid passages 84 communicating with the interior chamber 36 of the core tube. The passages 84 are disposed at an angle to the central axis of the fluid fitting and are for relieving fluid pressure arising from reciprocating movement of the armature assembly 46, and for venting air from chamber 36. It is contemplated that the system would withstand pressures of 1,200–1,500 psi, the ordinary operating condition of the fluid steering system.

An externally threaded cylindrical sleeve 86 is fitted into the bore 70 and threadably connected therewith. The sleeve 86 includes a central bore 88 for passing fluid therethrough and has an end 90 disposed axially inward of the end face 72 to define a closeable orifice.

The outer sleeve 40 is generally cylindrical, comprised of a ferromagnetic material, and adapted to slidably fit about the housing member 60. The sleeve 40 has opposite axial end faces 92 and 94, and an axial slot 96 extending longitudinally inwardly from the end face 94. The end face 92 is adapted to abut the mating face 78 of the pole piece flange and the end face 94 is adapted to abut the inner sleeve 44. The slot 96 is adapted to register with a longitudinal rib 31 formed on the housing 30, whereby to axially position the sleeve 40 relative to the opposite axial end faces of the housing member 60 and prevent the sleeve 40 from rotating relative to its fitment about the protective housing.

The inner sleeve 44 is comprised of a ferromagnetic material (i.e., a low carbon steel) which is not subject to hysteresis or tends to remain magnetized. The sleeve 44 is in the form of a cylindrical tube which is open at one end 98 and is formed to include a radially outwardly directed flange 100 at its other end. The sleeve 44 is inserted in the housing member 60 and disposed in a close encircling relation to the core tube 32, and is encircled, at least in part, by an end portion of the solenoid coil 38. The flange 100 defines a pair of end faces 102 and 104 facing in opposite axial directions with the end face 102 being adapted to engage the end face 94 of the outer sleeve 40. The purpose of the inner sleeve 44 is to form a flux collector with the flange 100 concentrating and radially directing the magnetic flux between the sleeves 40 and 44 during operation of the valve, without effecting the pulling force on the armature.

The core tube 32 is integrally formed of a nonferromagnetic material, is cup-shaped and comprises the generally cylindrical frame 34, a bottom wall 106 that closes one end of the tube and forms the interior pressure chamber 36, and a radially outwardly extending annular flange 108 at the other end of the tube, the annular flange 108 having mating faces 110 and 112 facing in opposite axial directions. The interior wall of the frame is formed with threads to threadably engage with the threaded end portion 68 of the pole piece 42. When assembled together, the mating end face 110 is brought into tight abutment with the mating end face 78 and is sealed by elastomeric seal 136.

While many nonmagnetizable materials are believed suitable, it has been found preferable to make the core tube of aluminum. Additionally, brass, bronze, copper or stainless steel, or mixtures of the above materials, are believed to be suitable. While it is believed that many manufacturing techniques are suitable, to optimize cost effectiveness, it is believed that the parts could be made from a machine operation on bar stock, or formed in a cold heading operation. In such operation, concentricity of the interior chamber wall can be accurately controlled. This is important because a gap between the frame and the armature must be kept to a minimum whereby to prevent rubbing between the armature and the frame, and allow armature movement, or to pass fluid, and to keep the magnetic field strength at a maximum.

The armature assembly 46 includes a magnetizable armature 114 encircled by the solenoid coil and a nonmagnetic plunger 116 fixedly connected to and projecting axially from the armature 114 for movement therewith and towards the orifice 90 whereby to adjust the volume of fluid passed through the valve. The armature is comprised of a ferromagnetic material, such as low carbon steel, or sintered powdered metal. The plunger is comprised of a nonmagnetic material, such as brass.

The armature is centrally located relative to the coil 38 to maximize, concentrate, and provide uniform magnetic flux. The armature 114 includes a generally cylindrical periphery 118, a rearward end 120 adapted to confront the bottom wall 106 of the chamber, and a forward end 122 defined by a generally frustoconical surface that is substantially identical to the frustoconical recess 80 formed in the pole piece to permit close nesting fitment. The frustoconical end faces formed by the armature and the pole piece recess establish an initial flux density within the pole piece, and cooperate to focus the magnetic flux induced by the coil through the pole piece.

To enhance axial reciprocating movement of the armature 114 in the fluid chamber, one or more longitudinal grooves 124 are provided in the surface 118. The grooves allow fluid in the chamber to flow axially between the opposite ends 120 and 122 of the armature, thereby enhancing response of the armature and inhibiting fluid lock of the armature. The fluid filled core tube dampens the armature, is pressurized by the power steering system, and will cool the solenoid coil.

The nonmagnetic plunger 116 is axially elongated and has a distal end 126 of generally conical shape adapted to be brought into close registry with the orifice 90 whereby to restrict fluid flow through the inlet. Further, a cylindrical bearing support 128 of brass, or similar material, is fixedly disposed in the bore 70 to support the plunger 116 for reciprocating movement and to assure that the conical end 126 is concentrically positioned relative to the orifice.

An annular ring or spacer 130 of nonmagnetic material is disposed between the armature 114 and the pole piece 42 to form an annular air gap which ensures that the armature does not magnetically attach to the pole piece and helps focus the magnetic flux lines during operation. Further, the ring 130 is dimensioned to ensure that the end 126 of the plunger is spaced from and does not completely close the orifice 90. Preferably, the spacer is comprised of powdered metal, such as bronze.

Retention of the flux collector 44 to the valve assembly is achieved by the retention ring 48. Preferably, the ring 48 is comprised of a nonmagnetic material. The retention ring is generally flat and has a radially expandable C-shaped body adapted to abut the face 104 defined by the radial flange 100, and can have tooth portions 132 which are directed radially inwardly to grip into the outer surface of the core tube 32.

For assembly, the fluid fitting 42 is assembled to include the bearing support 128 and the orifice sleeve 86. A pair of fluid seals 136 and 138, in the form of conventional O-rings, are fitted to the body 64. The spacer ring 130 is inserted about the plunger 116 whereupon the armature assembly 46 is inserted within the inner chamber 36 of the core tube 32. The core tube is then threadably secured to the end portion 68 of the pole piece 42 in such manner that the plunger is passed through the bearing support 128, and the mating end faces 78 and 110 are brought into abutting relation whereby to form a subassembly. In this regard, the end 106 of the core tube could be provided with a hexagonal recess 107 and the outer periphery of the flange 76 could be provided with flats 77 to allow the user to use tools to grip the two elements for threadable assembly.

The outer cylindrical sleeve 40 is positioned about the housing member 60 with the slot 96 registered with the rib 31. The subassembly of the core tube 32 and the pole piece 42 is inserted into the protective housing 30 such that the mating face 112 of the core tube flange 108 is brought into abutment with the end face of the housing member 60 and with the end face 92 of the outer sleeve 40. Thereafter, the inner sleeve 44 is inserted inwardly from the other end of the housing member 60 and over the core tube 32 such that the flange 100 is brought into abutment with the end face 94 of the outer sleeve. The retention ring 48 is expanded around the core tube and forced against the end face 104 of flange 100, whereby to hold the valve elements in assembled relation in the housing.

In operation, when the vehicle is started, the armature 114 is adjacent to the wall 106, and the plunger end 126 is spaced from the orifice 90 of sleeve 86, whereby the orifice is initially in its full open position (not shown). As discussed, fluid flow versus electrical current supplied to the coil is programmed in advance. Minimum flow from the control valve can be calibrated by adjusting the position of orifice 90 in relation to the conical end 126 of the plunger 116 when full current is applied to the coil 38 which holds the armature 114 against the stop 130.

As the vehicle speed increases, the ECU increases the electrical current through the coil 38 and a magnetic field is generated, thereby causing the armature and plunger assembly to advance towards the orifice 90. Consequently, as the vehicle speed increases, the fluid flow decreases and steerability is more refined. The plunger never completely closes the orifice, the maximum closure being such as shown in FIG. 2. Then, as vehicle speed goes down, the plunger moves away from the orifice and the fluid flow will increase to its maximum flow rate, whereby to assist in steering maneuvers, such as parking lots. The minimum flow is at high speeds so as to require more effort (i.e., high torque) to turn the steering wheel.

Further, the valve would fail in the full open whereby maximum flow to the steering gear is achieved. Advantageously, a separate spring element is not needed to force the plunger into the open position should the valve fail or when the electrical coil is de-energized. That is, should there be a failure of electricity to the coil, the fluid pressure would drive the armature assembly away from the orifice and towards the end wall 106. This would also be the situation at start up, where current would be at a minimum and the fluid pressure from the last vehicle operation would have driven the armature assembly to the full open condition.

Turning now to FIG. 3, the fitting 42 is axially elongated and includes the radial outlets 82 and the bearing support 128. To relieve pressure from the chamber 36, the stepped bore 70 includes an enlarged portion 134 adjacent the end portion 66, the support 128 and fitting have passages 140 and 142 to communicate fluid from the chamber to communicate fluid to the outlet 82, and the plunger 116 has its end 126 dimensioned for coaxial clearance fitment within the bore 70 to restrict flow.

FIG. 3 illustrates the path of magnetic flux, indicated at "F" and the direction of the plunger, indicated by the arrow "A". It is to be understood that the same path would exist for the embodiment discussed in connection with FIG. 2.

While the above description constitutes the preferred embodiment of the invention, it will be appreciated that the invention is susceptible to modification, variation, and change without departing from the proper scope or fair meaning of the accompanying claims.

What is claimed is:

1. A solenoid-operated proportional fluid valve for controlling the amount of fluid flow through the valve in accordance with the current supplied to the solenoid, comprising:
    a one-piece non-magnetic core tube having a closed end and an open end and defining a pressurizable fluid chamber;
    an axially movable armature slidably disposed within said core tube and having a substantially cylindrical main body portion;
    a pole piece connected to the open end of said core tube and comprising a fluid fitting having inlet and outlet ports and a restrictable orifice disposed between said fluid ports;
    a valve member operatively associated with said armature for controlling the flow of fluid through said orifice;
    an electrical coil encircling said core tube and having an axial length; and
    a plurality of magnetic segments which together with said armature and said pole piece define a flux path, including an end segment extending radially outward from the closed end of said core tube, an outer segment positioned on the outside of said coil and extending along the axial length of said coil between said pole piece and said end segment, and an inner segment positioned between said core tube and said coil and extending axially from said end segment along said main body portion of said armature for reducing the flux density in said flux path across said non-magnetic core tube.

2. The solenoid valve as claimed in claim 1 wherein said core tube includes a generally cylindrical inner wall, and said armature has an outer periphery disposed in a close sliding fitment with said inner wall and divides said fluid chamber into two chamber portions, and further including passage means operating between one said outer periphery and said inner wall for passing fluid between the chamber portions during movement of said armature.

3. The solenoid valve as claimed in claim 2 wherein said passage means comprises a groove formed in the outer periphery of said armature and extending between the opposite ends of the armature to pass fluid between the chamber portions.

4. The solenoid valve as claimed in claim 1 wherein one and the other of said armature and said fluid fitting is provided with a conical shape and a conical recess each dimensioned for nesting fitment, and a nonmagnetizable spacer forming an air gap between the conical surfaces for spacing the armature from the pole piece.

5. The solenoid valve of claim 4 wherein said armature extends between a planar and a conical end face, said valve member comprises a plunger extending from said conical end face of said armature, and said spacer means comprises a ring of nonmagnetizable material disposed around said plunger adjacent to said conical face.

6. The solenoid valve of claim 1 wherein said pole piece is threadably connected to said core tube.

7. The solenoid valve of claim 1 wherein said inner and outer magnetic segments comprise inner and outer sleeve members arranged concentrically, respectively, within and around said coil.

8. The solenoid valve as claimed in claim 7 wherein said outer sleeve includes opposite end faces, said end segment abutting one end face of said outer sleeve, and said pole piece includes a flange extending radially and abutting one end face of said outer sleeve.

9. The solenoid valve as claimed in claim 8 wherein said inner sleeve is generally cylindrical and interposed in close nesting fitment between the outer periphery of said core tube and said coil.

10. The solenoid valve as claimed in claim 8 wherein said end segment is integrally formed with and extends radially outward from said inner sleeve.

* * * * *